(12) United States Patent
Cho

(10) Patent No.: US 10,084,977 B2
(45) Date of Patent: Sep. 25, 2018

(54) CAMERA SYSTEM AND PHOTOGRAPHING METHOD

(71) Applicant: Hanwha Techwin Co., Ltd., Changwon-si (KR)

(72) Inventor: Sehoon Cho, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 147 days.

(21) Appl. No.: 15/054,212

(22) Filed: Feb. 26, 2016

(65) Prior Publication Data

US 2016/0330390 A1 Nov. 10, 2016

(30) Foreign Application Priority Data

May 7, 2015 (KR) ........................ 10-2015-0063883

(51) Int. Cl.
| | | |
|---|---|---|
| *H04N 5/228* | (2006.01) | |
| *H04N 5/357* | (2011.01) | |
| *H04N 5/225* | (2006.01) | |
| *G02B 27/00* | (2006.01) | |
| *G02B 27/28* | (2006.01) | |
| *H04N 5/238* | (2006.01) | |

(52) U.S. Cl.
CPC ....... *H04N 5/3572* (2013.01); *G02B 27/0018* (2013.01); *G02B 27/28* (2013.01); *H04N 5/2252* (2013.01); *H04N 5/2254* (2013.01); *H04N 5/238* (2013.01)

(58) Field of Classification Search
CPC .... H04N 5/3572; H04N 5/238; H04N 5/2254; H04N 5/2252; G02B 27/28; G02B 27/0018; G06K 9/00771; G08B 13/19617
USPC ................. 348/222.1, 57, 58, 752, 762, 767
See application file for complete search history.

(56) References Cited

U.S. PATENT DOCUMENTS

| | | | | |
|---|---|---|---|---|
| 2006/0104633 A1* | 5/2006 | Kenoyer | ................ | F16M 11/10 396/428 |
| 2007/0229842 A1* | 10/2007 | Jansen | .................... | G01B 11/06 356/492 |
| 2009/0122170 A1* | 5/2009 | Miyashita | ............... | G02B 5/008 348/294 |
| 2011/0223969 A1* | 9/2011 | Chou | ..................... | G03B 11/00 455/556.1 |

FOREIGN PATENT DOCUMENTS

| | | |
|---|---|---|
| JP | 2011102939 A | 5/2011 |
| KR | 100733765 B1 | 6/2007 |
| KR | 1020120064327 A | 6/2012 |

\* cited by examiner

*Primary Examiner* — Yogesh Aggarwal
(74) *Attorney, Agent, or Firm* — Sughrue Mion, PLLC

(57) ABSTRACT

A camera system includes a camera, a base configured to support the camera, a transparent cover that covers at least a portion of the camera and the base; a circular polarizer disposed between the camera and the transparent cover; and a controller configured to move at least one of the camera and the circular polarizer to arrange the camera to face the circular polarizer in a first surrounding environment, and move at least one of the camera and the circular polarizer to arrange the camera not to face the circular polarizer in a second surrounding environment.

18 Claims, 8 Drawing Sheets

CAMERA SYSTEM AND PHOTOGRAPHING METHOD

CROSS-REFERENCE TO RELATED PATENT APPLICATION

This application claims priority from Korean Patent Application No. 10-2015-0063883, filed on May 7, 2015 in the Korean Intellectual Property Office, the disclosure of which is incorporated herein by reference in its entirety.

BACKGROUND

1. Field

Apparatuses and methods consistent with exemplary embodiments relate to a camera system that reduces dome ghosts in photographed images and a photographing method using the camera system.

2. Description of the Related Art

Surveillance cameras are usually installed in government offices, border lines, coastlines, and business places, such as companies or banks, which require security. In some cases, surveillance cameras are also installed outside to monitor traffic in real time. In this case, a surveillance camera system uses a transparent dome cover to protect a camera from rainwater, moisture, dust, and foreign matters.

The camera may be disposed to rotate with respect to a base in a pan and/or tilt direction in order to photograph a wide area, and may have a zooming function.

However, when the camera is exposed to strong light (e.g., sunlight) incident in a photographing direction, the light may be reflected from at least one of a plurality of lenses included in the camera after passing through the transparent dome, and then reflected again from the dome upon reaching the inner surface of the dome. As a result, the light reflected from the inner surface of the dome may reach the camera.

This problem may occur when light is incident at an angle between 10° and 30° with respect to an optical axis of a lens system included in a camera. This problem may occur at various angles according to installation environments, distances between a camera lens and a dome cover, and diameters of the dome cover. When the aforementioned problem occurs, an unintended spot, namely, a dome ghost, exists on a captured image. The unintended spot may distort image information required in a surveillance area by users, cause an error to image processing due to partial strong light, or degrade speed and performance.

Light irregularly reflected by the surface of a target to be photographed due to a strong light source enters the camera and renders ambient light relatively dark. During photography in an automatic exposure mode, an image of a surveillance target or an image of the periphery of the surveillance target is rendered relatively dark, and thus accurate image information may not be obtained.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a camera system that reduces dome ghosts at a low cost, and a photographing method using the camera system.

According to an aspect of an exemplary embodiment, there is provided a camera system including: a camera; a base configured to support the camera; a transparent cover that covers at least a portion of the camera and the base; a circular polarizer disposed between the camera and the transparent cover; and a controller configured to move at least one of the camera and the circular polarizer to arrange the camera to face the circular polarizer in a first surrounding environment, and move at least one of the camera and the circular polarizer to arrange the camera not to face the circular polarizer in a second surrounding environment.

The controller may be further configured to determine that the camera is in the first surrounding environment when an image captured by the camera includes a beam spot, and determine that the camera is in the second surrounding environment when the beam spot does not exist in the captured image.

The camera system may further include a driver coupled to the base and rotating the camera.

The driver may include a panning driver configured to pan the camera in a horizontal plane of the base and a tilting driver configured to tile the camera in a vertical plane of the base.

The controller may control the driver to move the camera such that the camera faces or does not face the circular polarizer.

The circular polarizer may include a polarizer and a wavelength phase retarder sequentially arranged in a direction from the cover to the camera.

The circular polarizer may be attached to a support that is disposed between the cover and the camera and includes a transparent area.

The cover may be an outside cover of the camera system. The camera system may further include an inside cover disposed between the camera and the outside cover and coupled to the base to cover the camera. The support may be supported by the inside cover.

The support may be movably supported by the inside cover, and the controller may control the circular polarizer attached to the support to be positioned on a path of light incident upon the camera via the cover.

The cover may include a hemispherical area and a cylindrical area extending from the hemispherical area, and the camera system may further include a light shielding member disposed between the cylindrical area and the camera to shield light.

According to an aspect of another exemplary embodiment, there is provided a photographing method using a camera system including a camera, a base configured to support the camera, a transparent cover that covers at least a portion of the camera and the base, and a circular polarizer disposed between the camera and the cover, the method including: determining whether an image captured by the camera includes a beam spot generated from light which is incident on to the camera system; and controlling movement of at least one of the camera and the circular polarizer to arrange the camera to face the circular polarizer based on a result of the determining whether the captured image includes the beam spot.

The controlling may include controlling at least one of the camera and the circular polarizer to arrange the camera to face the circular polarizer in response to the captured images being determined as including the beam spot.

The controlling may include controlling at least one of the camera and the circular polarizer to arrange the camera not to face the circular polarizer in response to the captured images being determined as not including the beam spot.

The determining may include measuring an angle at which the light is incident upon the camera system; determining that the camera is in a first surrounding environment where the beam spot is generated in response to the angle being within a predetermined range; and determining that the surrounding environment is a second surrounding environment where no beam spots are generated in response to the angle deviating from the predetermined range.

The angle may be about 10° to about 30°.

The photographing method may further include capturing an image by using the camera, after the controlling.

The controlling may include determining whether the beam spot is generated, via a determination as to whether the beam spot is included in the image captured in the capturing.

The camera system may further include a driver that is coupled to the base and rotates the camera with respect to the base.

The controlling may include controlling the driver to move the camera to face the circular polarizer.

The circular polarizer may include a polarizer and a wavelength phase retarder sequentially arranged in a direction from the cover to the camera.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
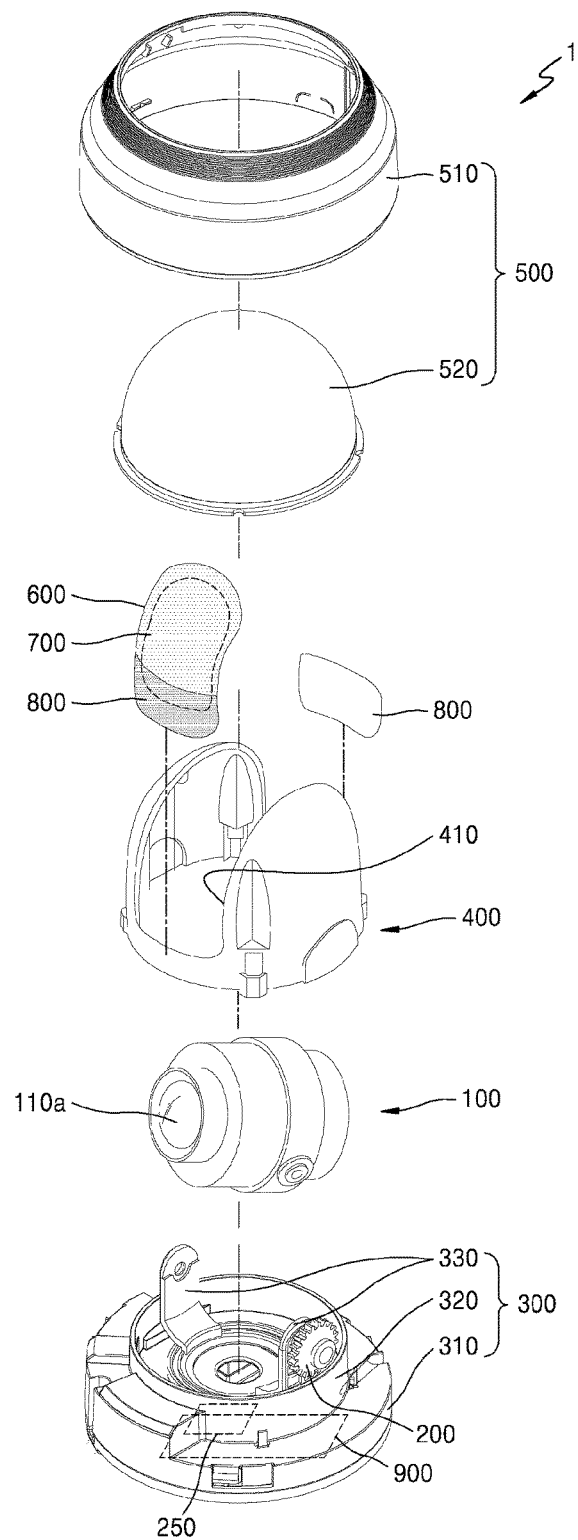
FIG. 1 is an schematic exploded perspective view of a dome camera system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

In the exemplary embodiments below, while such terms as "first," "second," etc., may be used to describe various components, such components must not be limited to the above terms. The above terms are used only to distinguish one component from another.

The terms used in the exemplary embodiments below are merely used to describe particular exemplary embodiments, and are not intended to limit the inventive concept. An expression used in the singular encompasses the expression of the plural, unless it has a clearly different meaning in the context. In the exemplary embodiments below, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following exemplary embodiments are not limited thereto.

FIG. 1 is a schematic exploded perspective view of a dome camera system 1 according to an exemplary embodiment.

Referring to FIG. 1, the dome camera system 1 according to an exemplary embodiment includes a camera 100, a base 300 supporting the camera 100, a dome cover 520 formed of a transparent material and covering at least a portion of the camera 100 and the base 300, a circular polarizer 700 disposed in a portion of an area between the camera 100 and the dome cover 520, and a controller 900 controlling the camera 100 to face or not face the circular polarizer 700 by moving at least one of the camera 100 and the circular polarizer 700 according to surrounding environments.

The dome camera system 1 according to an exemplary embodiment may include an outside cover 500 covering the camera 100 to prevent the camera 100 from being exposed to external air and foreign matters. The outside cover 500 may include a case 510 and the transparent dome cover 520 coupled to the case 510 and having a dome shape. The camera 100 may include a lens system 110 (see FIG. 2A) and an image sensor 120 (see FIG. 2A) and may capture light transmitted through the transparent dome cover 520 to record an image. Light transmitted by the dome cover 520 and incident upon the camera 100 may pass through the lens system 110 and then form an image on the image sensor 120.

The base 300 may include a fixed unit 310, and a rotating unit 320 rotating with respect to the fixed unit 310. Rotation of the rotating unit 320 may correspond to rotation in a horizontal plane, namely, panning, and the camera 100 supported by the based 300 may be rotated in connection with the rotation of the rotating unit 320. A panning driver 250 rotating the rotating unit 320, namely, the camera 100, may be coupled to the base 300.

The base 300 may further include a camera coupler 330 coupled with the camera 100. The camera coupler 330 may be coupled with the rotating unit 320, and the camera 100 may be rotatably supported by the camera coupler 330. Rotation of the camera 100 with respect to the camera coupler 330 may correspond to rotation in a vertical plane, namely, tilting. A tilting driver 200 rotating the camera 100 may be coupled to the base 300.

Accordingly, the camera 100 may be supported to be panned and tilt with respect to the fixed unit 310 of the base 300, and may include a zooming function. In other words, the dome camera system 1 according to an exemplary embodiment may be a pan-tilt-zoom (PTZ) camera. According to the location of an area intended to be photographed, the camera 100 may be panned and tilt by the panning driver 250 and the tilting driver 200, and the panning driver 250 and the tilting driver 200 may be controlled by the controller 900.

The circular polarizer 700 may be disposed in the portion of the area between the camera 100 and the dome cover 520. In other words, the area between the camera 100 and the dome cover 520 may include an area where the circular polarizer 700 is disposed, and an area where no circular polarizers 700 are disposed.

The circular polarizer 700 changes incident natural light to circularly polarized light. According to an exemplary embodiment, the circular polarizer 700 may include a polarizer 710 (see FIG. 2A) and a ¼ wavelength phase retarder 720 (see FIG. 2A) sequentially arranged in a direction from the dome cover 520 to the camera 100. A function of the circular polarizer 700 will be described later in detail.

According to an exemplary embodiment, the inside cover 400 to be coupled to the base 300 may be disposed between the dome cover 520 and the camera 100 so as to cover the camera 100. The inside cover 400 may be formed of an opaque material and may include an opening 410. The opening 410 may be disposed to correspond to an area between the dome cover 520 and a light incidence surface 110a of the camera 100, and may secure a light path between the dome cover 520 and the light incidence surface 110a of the camera 100 so that light transmitted by the dome cover 520 is not blocked by the opaque inside cover 400.

Since the camera 100 may be tilted, the opening 410 may be formed in the inside cover 400 along a tilt path of the camera 100.

According to an exemplary embodiment, a support 600 including a transparent area may be disposed between the camera 100 and the dome cover 520. In detail, the support 600 may be disposed between the dome cover 520 and the light incidence surface 110a of the camera 100 on the path that incident light is transmitted through the dome cover 520 and then travels towards the camera 100.

The circular polarizer 700 may be coated on the support 600 or may be attached thereto in a film shape. The circular polarizer 700 may be attached to an inner surface or outer surface of the support 600 and may include the polarizer 710 (see FIG. 2A) and the ¼ wavelength phase retarder 720 (see FIG. 2A) sequentially arranged in the direction from the dome cover 520 to the camera 100. According to an exemplary embodiment, a light shielding member 800 in addition to the circular polarizer 700 may be further attached to the support 600. A function of the light shielding member 800 will be described later in detail.

The support 600 may be disposed in an area corresponding to the opening 410 of the inside cover 400, and an edge of the support 600 may be supported by the inside cover 400. The circular polarizer 700 attached to the support 600 may be disposed on a portion of the area corresponding to the opening 410, namely, on only a portion of the tilt path of the camera 100. The circular polarizer 700 may be formed on the extension from the inside cover 400.

Although the light shielding member 800 may be disposed on each of the both ends of the opening 410, this is only an example, and the light shielding member 800 may be omitted.

Figure 2A:
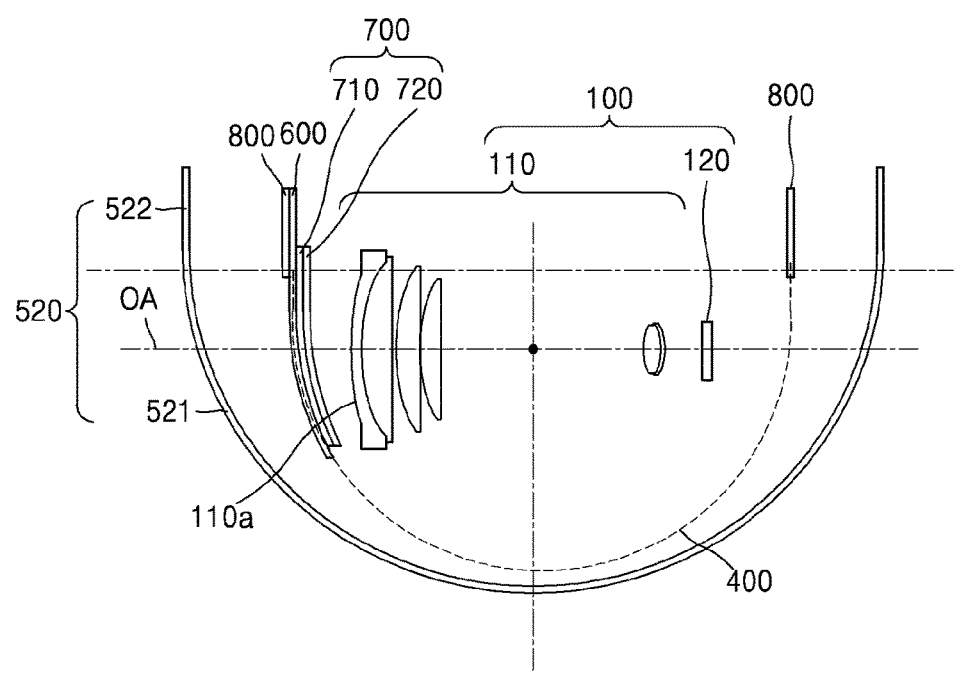
FIGS. 2A and 2B are cross-sectional views schematically illustrating a camera directed toward a circular polarizer in an environment where a dome ghost is generated and the camera not directed toward the circular polarizer in an environment where no dome ghosts are generated, respectively.
Figure 2B:
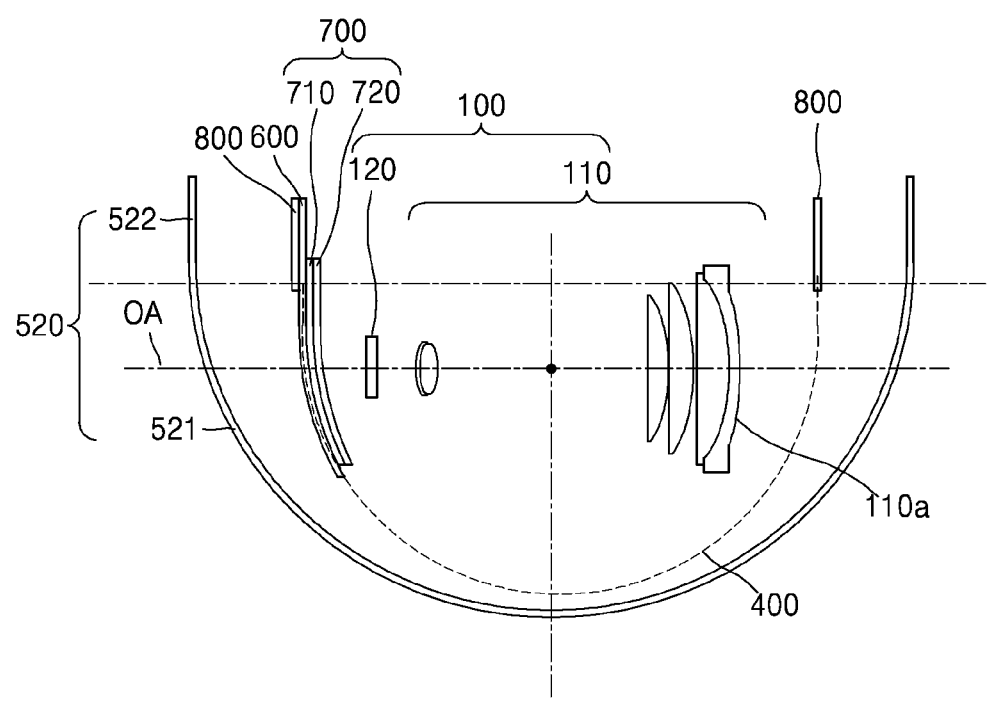
Figure 3A:
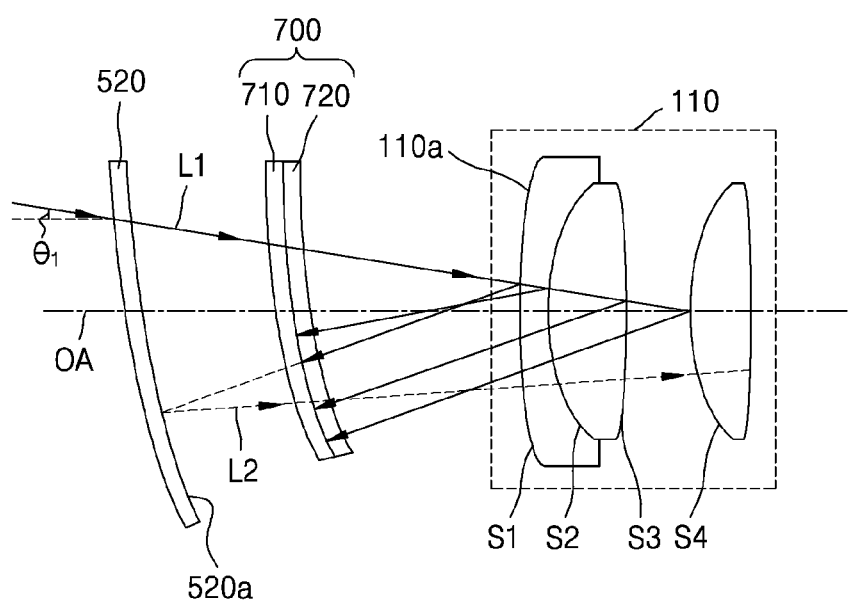
FIGS. 3A and 3B are conceptual views respectively illustrating paths of light incident from the outside in FIGS. 2A and 2B.
Figure 3B:
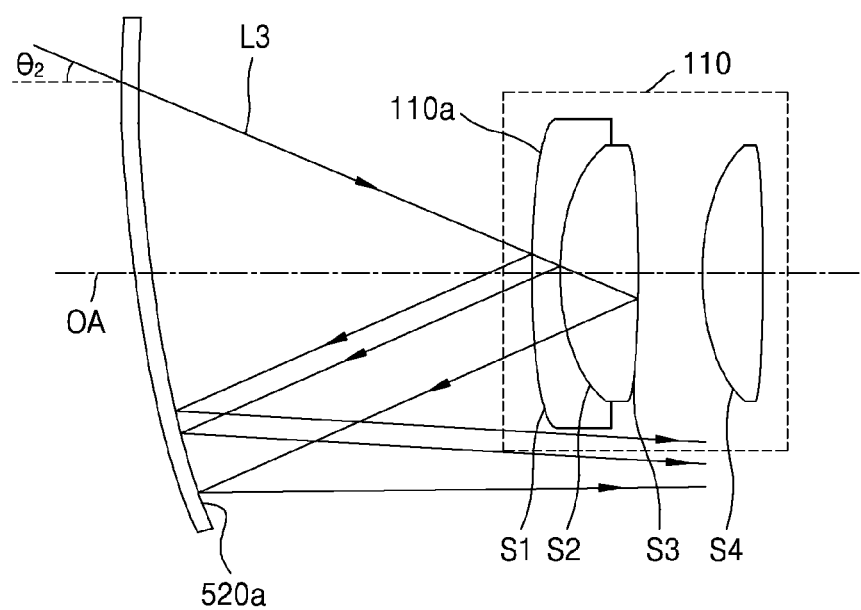

FIGS. 2A and 2B are cross-sectional views schematically illustrating the camera 100 directed toward the circular polarizer 700 in an environment where a dome ghost is generated and the camera 100 not directed toward the circular polarizer 700 in an environment where no dome ghosts are generated, respectively. FIGS. 3A and 3B are conceptual views respectively illustrating paths of light incident from the outside in FIGS. 2A and 2B.

Referring to FIGS. 2A and 3A, the camera 100 may be disposed to face the circular polarizer 700 in the environment where a dome ghost is generated. Since the camera 100 is able to tilt, the camera 100 may be freely disposed either to face or not face the circular polarizer 700.

A dome ghost may be generated by strong light or the like externally incident upon the dome camera system 1. For example, the light may be sunlight. For example, external light L1 may be incident upon the dome camera system 1 at an angle $\theta_1$ with respect to an optical axis OA of the lens system 110 included in the camera 100, and may be reflected from surfaces S1, S2, S3, and S4 of lenses included in the lens system 110. The camera 100 may include a plurality of lenses to form an image on the image sensor 120 while minimizing aberration. To perform zooming, the camera 100 may include a plurality of lens groups capable of moving relative to one another.

The external light L1 may be reflected from the surfaces S1, S2, S3, and S4 of the plurality of lenses and the reflected light L1 may be incident onto an inner surface 520a of the dome cover 520. The dome camera system 1 according to an exemplary embodiment may include the circular polarizer 700 disposed between the dome cover 520 and the light incidence surface 110a of the camera 100. Under the configuration, light L1 reflected from the surfaces S1, S2, S3, and S4 of the lenses may be blocked by the circular polarizer 700 so that the reflected light L1 does not reach the inner surface 520a of the dome cover 520.

In FIG. 3A, light L2 indicated by a dotted line indicates a light path when no circular polarizers 700 are disposed. When no circular polarizers 700 are disposed, the light L2 reflected from the surfaces S1, S2, S3, and S4 of the lenses may be incident upon the inside surface 520a of the dome cover 520, and reflected from the inside surface 520a of the dome cover 520. The light L2 reflected from the inside surface 520a of the dome cover 520 may be incident upon the camera 100 and shown as an undesired bright spot (e.g., a dome ghost) on a captured image.

An environment where a dome ghost may be generated denotes an environment in which external light transmitted by the dome cover 520 and then reflected by the surfaces S1, S2, S3, and S4 of the lenses may be reflected again from the inside surface 520a of the dome cover 520 and incident upon the camera 100. For example, the environment where a dome ghost may be generated may be an environment in which external light is incident upon the dome camera system 1 at an angle of about 10° to about 30° with respect to the optical axis OA of the lens system 110. According to an exemplary embodiment, the angle $\theta_1$ of FIG. 3A may be about 10° to about 30°.

In this environment, the camera 100 may be directed toward an area where the circular polarizer 700 is disposed, according to a control signal of the controller 900, and the circular polarizer 700 may block the light reflected from the surfaces S1, S2, S3, and S4 of the lenses such that the reflected light is not incident upon the dome cover 520.

The circular polarizer 700 may include the polarizer 710 and the ¼ wavelength phase retarder 720. Natural light externally incident upon the circular polarizer 700 via the dome cover 520 may be polarized in one direction by the polarizer 710, and the polarized light may be changed to clockwise or counterclockwise circularly polarized light by the ¼ wavelength phase retarder 720.

The clockwise or counterclockwise circularly polarized light may be reflected from the surfaces S1, S2, S3, and S4 of the lenses. Due to phase delay by reflection, the clockwise circularly polarized light may be changed to counterclockwise circularly polarized light, and the counterclockwise circularly polarized light may be changed to clockwise circularly polarized light.

The clockwise or counterclockwise circularly polarized light may be changed to linearly polarized light while being incident back upon the ¼ wavelength phase retarder 720, and the linearly polarized light may be polarized light rotated by 90° with respect to a polarization axis of the polarizer 710. Accordingly, the polarized light in a 90°-rotated direction fails to penetrate through the polarizer 710 and is thus blocked thereby. In other words, the light reflected by the surfaces S1, S2, S3, and S4 of the lenses is blocked by the circular polarizer 700 and is not incident upon the dome cover 520, and accordingly no dome ghosts may be generated.

Due to this feature, not only light incident directly from the sun but also irregular reflection light reflected by a window, cloud, tree leaves, or the surface of the water are not incident upon the image sensor 120 included in the camera 100. Thus, interference or damage of an image acquired by the dome camera system by this irregular reflection light may be prevented.

Referring back to FIG. 2A, the circular polarizer 700 may be attached to the support 600 including the transparent area, and the light shielding member 800 in addition to the circular polarizer 700 may be further attached to the support 600.

Although FIG. 2A illustrates a case where the circular polarizer 700 is attached to the inner surface of the support 600 and the light shielding member 800 is attached to the outer surface of the support 600, the exemplary embodiment is not limited thereto. The circular polarizer 700 may be attached to the outer surface of the support 600, and the light shielding member 800 may exist as a separate member not attached to the support 600 or may be omitted.

According to an exemplary embodiment, the dome cover 520 may include a hemispherical area 521, and a cylindrical area 522 extending from the hemispherical area 521. The camera 100 may have a predetermined angle of view and may photograph an external background or the like existing within the predetermined angle of view. However, when the dome cover 520 does not include the cylindrical area 522 and a case or a housing that blocks light is disposed at a location designated for the cylindrical area 522, a photographing range may be narrowed.

Accordingly, the dome cover 520 may further include the cylindrical area 522 in addition to the hemispherical area 521. However, light transmitted by the cylindrical area 522 and incident upon the camera may be distorted due to, for example, a difference between curvatures of the hemispherical and cylindrical areas 521 and 522, and thus a partial area of the captured image may be distorted.

The light shielding member 800 may block light in a region capable of causing distortion from among the light externally incident via the dome cover 520. In other words, by appropriately arranging the second area 522 and the light shielding member 800, a maximal photographing range may be secured, and a phenomenon that a distorted image appears on a captured image may be minimized.

Referring to FIGS. 2B and 3B, the camera 100 may be disposed not to face the circular polarizer 700, in the environment where no dome ghosts are generated.

External light L3 may be incident upon the dome camera system 1 at an angle $\theta_2$ with respect to the optical axis OA of the lens system 110 included in the camera 100, and may be reflected from the surfaces S1, S2, S3, and S4 of the lenses included in the lens system 110. The camera 100 may include a plurality of lenses to form an image on the image sensor 120 while minimizing aberration. To perform zooming, the camera 100 may include a plurality of lens groups capable of moving relative to one another.

In other words, the external light L2 may be reflected from the surfaces S1, S2, S3, and S4 of the plurality of lenses and be incident back on an inner surface 520a of the dome cover 520. An environment where no dome ghosts appear may be an environment where strong light directly incident upon the dome camera system 1 does not exist or, even when the strong light exists, the angle of incident light with respect to the optical axis OA of the lens system 110 deviates from a predetermined range, for example, a range of about 10° to about 30°.

Referring to FIG. 3B, when $\theta_2$ exceeds about 30°, even when light reflected by the surfaces S1, S2, S3, and S4 of the lenses is incident upon the inner surface 520a of the dome cover 520, light reflected by the inner surface 520a is not incident upon the camera 100 and travels in another path, and thus no dome ghosts may be generated on the captured image.

Referring to FIG. 2B, in the environment where no dome ghosts are generated, the light incidence surface 110a of the inside surface 520a may face an area where no circular polarizers 700 are disposed. In this case, a light amount reduction by the circular polarizer 700 may be prevented.

As described above, the camera 100 may be panned and tilt by the panning driver 250 and the tilting driver 200, and the panning driver 250 and the tilting driver 200 may be controlled by the controller 900. Accordingly, in the environment where a dome ghost is generated, the controller 900 may rotate the camera 100 such that the light incidence surface 110a of the camera 100 faces the area where the circular polarizer 700 is disposed. In the environment where no dome ghosts are generated, the controller 900 may rotate the camera 100 such that the light incidence surface 110a of the light incidence surface 110a faces the area where no circular polarizers are disposed.

The controller 900 may be manufactured, for example, as a circuit substrate including a semiconductor chip and a circuit, or may be implemented in any of various forms such as a circuit or software built in a semiconductor chip or software executable by a computer. A user may manually issue a command to the controller 900, and may determine via a currently-received image analysis that a dome ghost is generated due to a relative contrast, illumination, or the like due to a dome ghost, and may allow the controller 900 to automatically control camera drivers.

Figure 4:
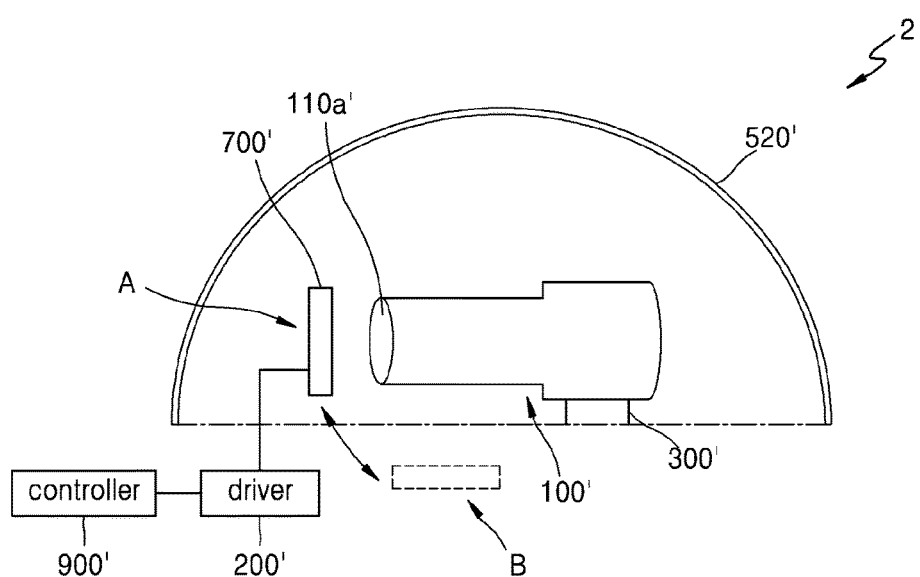
FIG. 4 is a schematic exploded perspective view of a dome camera system according to another exemplary embodiment.

FIG. 4 is a schematic exploded perspective view of a dome camera system 2 according to another exemplary embodiment.

Referring to FIG. 4, the dome camera system 2 according to another exemplary embodiment includes a camera 100', a base 300' supporting the camera 100', a dome cover 520' formed of a transparent material and covering at least a portion of the camera 100' and the base 300', a circular polarizer 700' disposed in a portion of an area between the camera 100' and the dome cover 520', and a controller 900' controlling the camera 100' to face an area where the circular polarizer 700' is disposed or an area where no circular polarizers 700' are disposed, by moving at least one of the camera 100' and the circular polarizer 700' according to surrounding environments.

The camera 100' may be fixed to the base 300' and may be supported to be panned and/or tilt. The circular polarizer 700' may be disposed in an area A between the dome cover 520' and a light incidence surface 110a' of the camera 100', or in an area B other than the area A.

In other words, in the environment where a dome ghost is generated, the circular polarizer 700' may be disposed in the area A between the dome cover 520' and the light incidence surface 110a' of the camera 100'. In the environment where no dome ghosts are generated, the circular polarizer 700' may not be disposed in the area A between the dome cover 520' and the light incidence surface 110a' of the camera 100'.

The circular polarizer 700' may be driven by a circular polarizer driver 200', and the circular polarizer driver 200' may be driven according to a control signal of the controller 900' and may move the circular polarizer 700' to a desired location.

Although not shown in FIG. 4, the dome camera system 2 according to another exemplary embodiment may further include components corresponding to the support 600 and the inside cover 400 included in the dome camera system 1 of FIG. 1. In this case, the circular polarizer 700' may be attached to the support 600, and the support 600 may be movably supported by the inside cover 400.

The controller 900' may control the circular polarizer driver 200' to move the support 600 with respect to the inside cover 400, and thus the circular polarizer 700' may penetrate through the dome cover 520' and be positioned on the path of light incident upon the camera 100' or positioned outside the path of the light.

Figure 5:
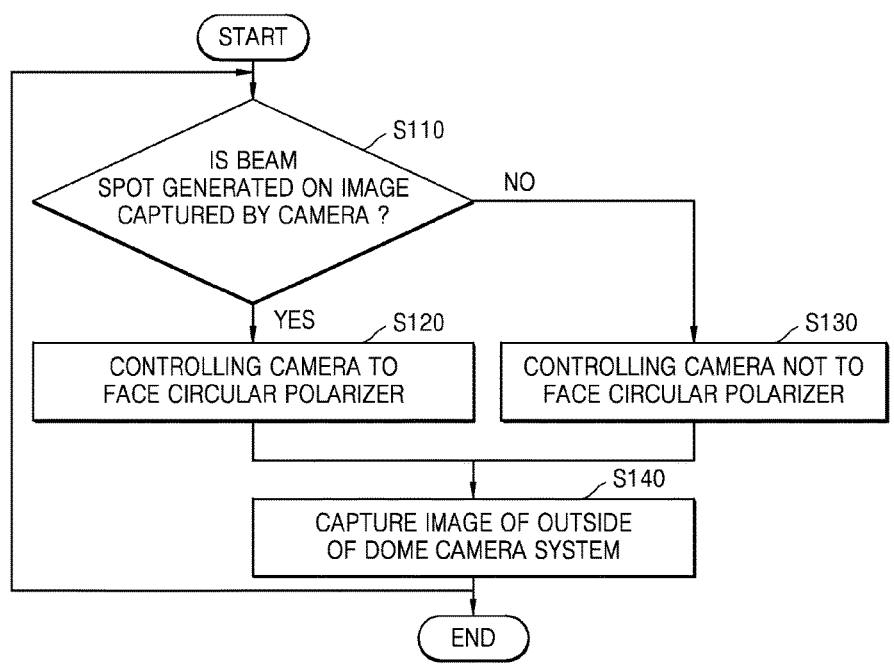
FIG. 5 is a flowchart of a photographing method using a dome camera system according to an exemplary embodiment.

FIG. 5 is a flowchart of a photographing method using a dome camera system according to an exemplary embodiment.

Referring to FIGS. 1, 4, and 5, a photographing method using the dome camera systems 1 and 2 according to an exemplary embodiment includes an operation S110 of determining whether a beam spot is generated on an image captured by the cameras 100 and 100' due to light incident from the outside of the dome camera systems 1 and 2. The operation S110 may be performed by a controller 900. The photographing method may further includes operations S120 and S130 of controlling the cameras 100 and 100' to face or not face the circular polarizers 700 and 700' by moving at least one of the cameras 100 and 100' and the circular polarizers 700 and 700' according to the determination. The controller 900 may transmit a control signal to the rotating unit 320 based on a result of the determination whether a beam spot is generated on the captured image. For example, the control signal may command the rotating unit 320 to move so that the camera 100 is positioned to face the circular polarizers 700 when the controller 900 determines that a beam spot is generated on the image. On the other hand, the control signal may command the rotating unit 320 to move the position of the cameras 100 and 100' not to face the circular polarizers 700 and 700' when the controller 900 determines that a beam spot does not exist in the image. The controller 900 may store information of a range of angles that allows the camera 100 to face the circular polarizers 700 and 700', and determine a movement angle of the rotating unit 320 based on a current position of the camera 100, the determination result of the operation S110, and the stored information of the range of the angles. The control signal transmitted from the controller 900 to the rotating unit 320 may include information of the movement angle.

The light incident from the outside may be light incident directly from the outside or irregular reflection light, namely, sunlight reflected by a window, cloud, tree leaves, or the surface of water. The light incident from the outside may be light having a stronger intensity than light incident from backgrounds around the dome camera systems 1 and 2. This light may be reflected by a lens or the like included in the cameras 100 and 100' and then reflected again by the dome covers 520 and 520' and incident back upon the cameras 100 and 100'.

Even when the light exists, an unintended beam spot, namely, a dome ghost, may appear on an image captured by the light incident back upon the cameras 100 and 100', only under specific conditions. A detailed description thereof has been described above in detail, and thus will be omitted herein.

In an environment where a beam spot is generated on a captured image, the cameras 100 and 100' may be controlled to face the circular polarizers 700 and 700' by moving at least one of the cameras 100 and 100' and the circular polarizers 700 and 700'. On the other hand, in an environment where no beam spots are generated on a captured image, the cameras 100 and 100' may be controlled to not face the circular polarizers 700 and 700' by moving at least one of the cameras 100 and 100' and the circular polarizers 700 and 700'.

Operations S120 and S130 may be followed by an operation S140 of capturing an image of the outside of the dome camera systems 1 and 2 by using the cameras 100 and 100'.

Several methods may be used to determine whether a current environment is an environment where the beam spot is generated. According to an exemplary embodiment, it may be determined whether a beam spot is generated, via a determination as to whether the beam spot is included in the image captured in operation S140. In other words, when a beam spot is included in the captured image, the cameras 100 and 100' may be controlled to face the circular polarizers 700 and 700' by moving at least one of the cameras 100 and 100' and the circular polarizers 700 and 700'. Thus, the beam spot may not be included in the captured image.

The dome camera system 1 of FIG. 1 may include a driver that rotates the camera 100 with respect to the base 300. The driver may include the panning driver 250 that pans the camera 100 in a horizontal plane of the base 300, and the tilting driver 200 that tilts the camera 100 in a vertical plane of the base 300.

In other words, the dome camera system 1 of FIG. 1 may control the driver to move the camera 100 according to a surrounding environment such that the camera 100 faces or does not face the circular polarizer 700.

According to an exemplary embodiment, the circular polarizer 700 may include the polarizer 710 and the ¼ wavelength phase retarder 720 sequentially disposed in the direction from the dome cover 520 to the camera 100. The ¼ wavelength phase retarder 720 may be replaced by various combinations of retarders that cause a ¼ wavelength delay.

Figure 6:
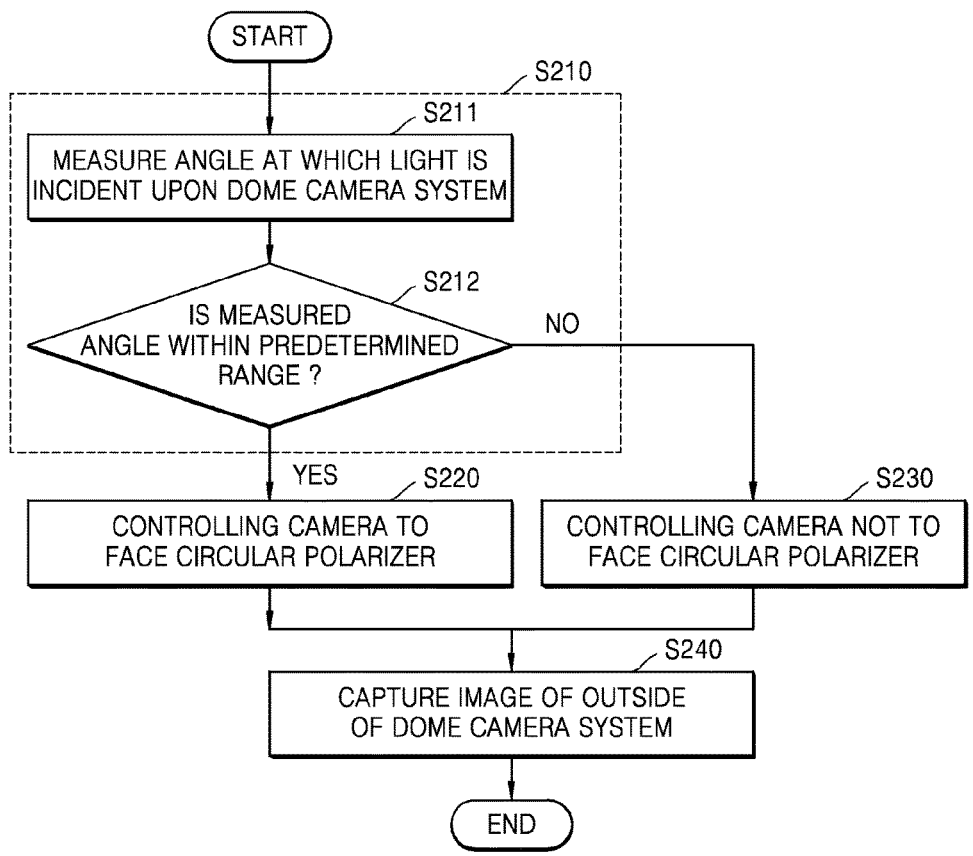
FIG. 6 is a flowchart of a photographing method using a dome camera system according to another exemplary embodiment.

FIG. 6 is a flowchart of a photographing method using a dome camera system according to another exemplary embodiment.

Referring to FIG. 6, a photographing method using the dome camera systems 1 and 2 according to another exemplary embodiment includes an operation S210 of determining whether a beam spot is generated on an image captured by the cameras 100 and 100' due to light incident from the outside of the dome camera systems 1 and 2, and operations S220 and S230 of controlling the cameras 100 and 100' to face or not face the circular polarizers 700 and 700' by moving at least one of the cameras 100 and 100' and the circular polarizers 700 and 700' according to the determination. Controlling operations S220 and S230 may be followed by an operation S240 of capturing an image of the outside of the dome camera systems 1 and 2 by using the cameras 100 and 100'.

Controlling operations S220 and S230 and image-capturing operation S240 are the same as controlling operations S120 and S130 and image-capturing operation S140 of FIG. 5, and thus detailed descriptions thereof will be omitted.

According to an exemplary embodiment, operation S210 of determining whether the beam spot is generated may include operation S211 of measuring an angle at which light is incident upon the dome camera systems 1 and 2, and operation S212 of determining that a current environment is an environment where the beam spot is generated when the angle is within a predetermined range, and determining that a current environment is an environment where not beam spots are generated when the angle deviates from the predetermined range.

The angle is about 10° to about 30°. When sunlight or the like is incident upon the dome camera systems 1 and 2 at the angle, it may be determined that a current environment is an environment where the beam spot is generated on the captured image, and the cameras 100 and 100' may be controlled to face the circular polarizers 700 and 700 so that generation of the beam spot on the captured image may be prevented.

The determining operations of FIGS. 5 and 6 may be performed side by side. In other words, as shown in FIG. 6, controlling operations S220 and S230 and image-capturing operation S240 may be performed after determining a surrounding environment based on the light-incidence angle. Then, as shown in FIG. 5, a surrounding environment may be determined again from a captured image, and then controlling operations S120 and S130 and image-capturing operation S140 may be performed. According to an embodiment, the operations may be repeated. As described above, in the dome camera systems 1 and 2 according to exemplary embodiments, and photographing methods using the dome camera systems 1 and 2, the circular polarizers 700 and 700' are disposed in only portions of the areas between the dome covers 520 and 520' and the cameras 100 and 100' by utilizing the characteristics of the components included in a typical surveillance camera system and operations thereof. Thus, dome ghost may be efficiently reduced at a low cost.

Although the above-described embodiments illustrate a case where a cover has a dome shape, the shape of a surface or cross-section of the cover is not limited thereto. In a camera system according to an embodiment and a photographing method using the camera system, light incident upon a camera is reflected by the surface of at least one lens included in the camera and then reflected again by an object in front of the lens and incident upon the camera system, and thus various spots, ghost, and irregular reflection are effectively prevented. Accordingly, image information including no above-described problems may be acquired.

According to an embodiment as described above, a dome camera system having a reduced dome ghost at a low cost, and a photographing method using the dome camera system may be provided.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A camera system comprising:
   a camera;
   a base configured to support the camera;
   a transparent cover that covers at least a portion of the camera and the base;
   a circular polarizer disposed between the camera and the transparent cover; and
   a controller configured to move at least one of the camera and the circular polarizer to arrange the camera to face the circular polarizer in a first surrounding environment, and move at least one of the camera and the circular polarizer to arrange the camera not to face the circular polarizer in a second surrounding environment,
   wherein the circular polarizer is attached to a support that is disposed between the transparent cover and the camera and comprises a transparent area.

2. The camera system of claim 1, wherein the controller is further configured to determine that the camera is in the first surrounding environment when an image captured by the camera includes a beam spot, and determine that the camera is in the second surrounding environment when the beam spot does not exist in the captured image.

3. The camera system of claim 1, further comprising a driver that is coupled to the base and configured to rotate the camera.

4. The camera system of claim 3, wherein the driver comprises a panning driver configured to pan the camera in a horizontal plane of the base and a tilting driver configured to tile the camera in a vertical plane of the base.

5. The camera system of claim 3, wherein the controller is further configured to control the driver to move the camera such that the camera faces or does not face the circular polarizer.

6. The camera system of claim 1, wherein the circular polarizer comprises a polarizer and a wavelength phase retarder sequentially arranged in a direction from the transparent cover to the camera.

7. The camera system of claim 1, wherein
   the transparent cover is an outside cover of the camera system, the camera system further comprises an inside cover disposed between the camera and the outside cover and coupled to the base to cover the camera, and
the support is supported by the inside cover.

8. The camera system of claim 7, wherein
the support is movably supported by the inside cover, and
the controller is further configured to control the circular polarizer attached to the support to be positioned on a path of light incident upon the camera via the transparent cover.

9. A camera system comprising:
a camera;
a base configured to support the camera;
a transparent cover that covers at least a portion of the camera and the base;
a circular polarizer disposed between the camera and the transparent cover; and
a controller configured to move at least one of the camera and the circular polarizer to arrange the camera to face the circular polarizer in a first surrounding environment, and move at least one of the camera and the circular polarizer to arrange the camera not to face the circular polarizer in a second surrounding environment, wherein
the transparent cover comprises a hemispherical area and a cylindrical area extending from the hemispherical area, and
the camera system further comprises a light shielding member disposed between the cylindrical area and the camera to shield light.

10. A photographing method using a camera system including a camera, a base configured to support the camera, a transparent cover that covers at least a portion of the camera and the base, and a circular polarizer disposed between the camera and the transparent cover, the photographing method comprising:
determining whether an image captured by the camera includes a beam spot generated from light which is incident on to the camera system; and
controlling movement of at least one of the camera and the circular polarizer to arrange the camera to face the circular polarizer based on a result of the determining whether the captured image includes the beam spot,
wherein the determining comprises:
measuring an angle at which the light is incident upon the camera system;
determining that the camera is in a first surrounding environment where the beam spot is generated in response to the angle being within a predetermined range; and
determining that the camera is in a second surrounding environment where no beam spots are generated in response to the angle deviating from the predetermined range.

11. The photographing method of claim 10, wherein the controlling comprises controlling at least one of the camera and the circular polarizer to arrange the camera to face the circular polarizer in response to the captured image being determined as including the beam spot.

12. The photographing method of claim 10, wherein the controlling comprises controlling at least one of the camera and the circular polarizer to arrange the camera not to face the circular polarizer in response to the captured image being determined as not including the beam spot.

13. The photographing method of claim 10, wherein the angle is about 10° to about 30°.

14. The photographing method of claim 10, further comprising capturing an image by using the camera, after the controlling.

15. The photographing method of claim 14, wherein the controlling comprises determining whether the beam spot is generated, via a determination as to whether the beam spot is included in the image captured in the capturing.

16. The photographing method of claim 10, wherein the camera system further comprises a driver that is coupled to the base and rotates the camera with respect to the base.

17. The photographing method of claim 16, wherein the controlling comprises controlling the driver to move the camera to face the circular polarizer.

18. The photographing method of claim 10, wherein the circular polarizer comprises a polarizer and a wavelength phase retarder sequentially arranged in a direction from the transparent cover to the camera.

* * * * *